United States Patent
Andrews et al.

(10) Patent No.: US 6,669,802 B2
(45) Date of Patent: Dec. 30, 2003

(54) COMPOSITE RISER

(75) Inventors: Albert A. Andrews, Cleveland, TN (US); Spencer Land, Henderson, NV (US)

(73) Assignee: Spenco, Dunlap, TN (US)

( * ) Notice: Subject to any disclaimer, the term of this patent is extended or adjusted under 35 U.S.C. 154(b) by 205 days.

(21) Appl. No.: 09/745,661

(22) Filed: Dec. 21, 2000

(65) Prior Publication Data

US 2002/0079047 A1 Jun. 27, 2002

(51) Int. Cl.[7] .............................. B32B 31/00; F41B 5/00
(52) U.S. Cl. .................... 156/245; 156/93; 264/257; 264/258; 264/324
(58) Field of Search .............................. 156/245, 307.1, 156/91, 92, 93, 252, 307.3; 264/241, 257, 258, 324; 124/23.1, 86, 87, 88, 89, 24.1, 25.6

(56) References Cited

U.S. PATENT DOCUMENTS

| | | | | |
|---|---|---|---|---|
| 4,414,049 A | * | 11/1983 | Jones | 156/166 |
| 4,659,071 A | * | 4/1987 | Woltron | 267/149 |
| 4,693,230 A | * | 9/1987 | Sugouchi | 124/88 |
| 5,118,373 A | * | 6/1992 | Krummenacher | 156/175 |
| 5,248,467 A | * | 9/1993 | Cushman | 264/102 |
| 5,516,271 A | * | 5/1996 | Swenor et al. | 425/127 |
| 5,845,388 A | * | 12/1998 | Andrews et al. | 29/527.1 |

\* cited by examiner

*Primary Examiner*—Michael W. Ball
*Assistant Examiner*—Gladys Corcoran
(74) *Attorney, Agent, or Firm*—Reising, Ethington, Barnes, Kisselle, P.C.

(57) ABSTRACT

A composite riser for an archery bow formed from fibers embedded in resin in such a way that resin rich areas, dry fibers and voids are eliminated, providing consistent risers of high quality. The location of structural fibers, such as a carbon fibers or fiberglass composite materials, is ensured within a mold used to form the riser and relative to the resin which bonds the fibers together. Various processes may be used to form the riser with control of the fibers and resin maintained. For example, structural reaction injection molding, liquid composite molding, continuous fiber molding, modified compression molding, resin transfer molding and variable infusion molding processes can be used.

21 Claims, 7 Drawing Sheets

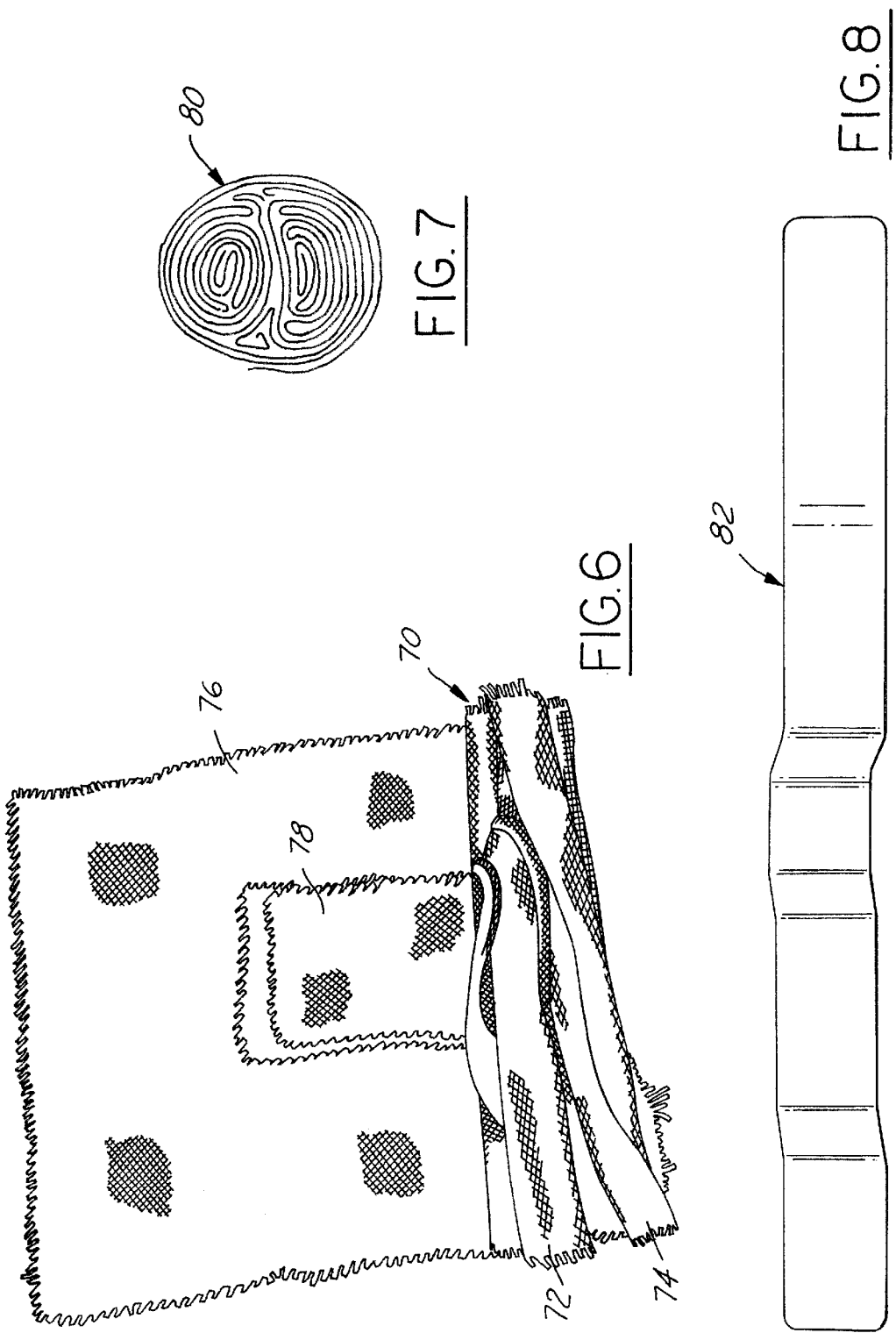

COMPOSITE RISER

FIELD OF THE INVENTION

This invention relates generally to archery bows and more particularly to a riser of an archery bow.

BACKGROUND OF THE INVENTION

Compound archery bows typically have a riser with a handle portion grippable by the user and a pair of limbs connected to the riser and extending from opposed ends of the riser with one or more strings trained around a cam at the free end of each limb. The risers are formed from a metal, such as aluminum, due to its strength to weight characteristics. The metal riser may be either extruded or cut from bar stock.

Attempts have been made to form risers of archery bows from carbon fiber or other composite materials. One method is a so-called "resin transfer molding process" in which fibers are placed loosely into a mold and under pressure a resin is injected into the mold. However, the loose fibers in the mold are displaced by the injected pressurized resin resulting in voids in the formed riser, dry fibers not saturated by resin and areas rich in resin but without sufficient fibers therein creating weak spots or voids in the riser. Attempts to fire an archery bow having such a riser quickly results in failure of the riser by cracking or other fracture. Particularly hazardous is the "dry firing" of a poorly formed polymeric riser due to the increased vibration and stresses on the bow. Such poorly formed composite risers fail quickly when dry fired. Further, loose, random positioning of fibers in the mold and the displacement of fibers due to the injection of the resin into the mold, results in very inconsistent parts from one riser to the next. Unfortunately, the structural integrity of any given riser is unknown, absent obvious deformations of flaws. Accordingly, the location of voids or resin rich areas vary from part to part and could not be readily detected until the bow was fired and failure, such as fracture of the riser, occurred.

SUMMARY OF THE INVENTION

A composite riser for an archery bow formed from fibers embedded in resin in such a way that resin rich areas, dry fibers and voids are eliminated, providing consistent risers of high quality. The location of structural fibers, such as a carbon fibers or fiberglass composite materials, is ensured within a mold used to form the riser and relative to the resin which bonds the fibers together. Various processes may be used to form the riser with control of the fibers and resin maintained. For example, structural reaction injection molding, liquid composite molding, continuous fiber molding, modified compression molding, resin transfer molding and variable infusion molding processes can be used.

Objects, features and advantages of this invention include providing an archery bow having a composite riser and a method of making the composite riser which eliminates resin rich areas, eliminates voids in the riser, eliminates dry fibers, provides consistent parts of high integrity, enables formation of the riser by a plurality of molding processes, controls the orientation and location of fibers in the mold, can produce a riser molded in substantially its final shape to reduce machining, reduces waste of material when forming the riser, may utilize unidirectional fibers, may utilize woven fiber sheets, may utilize filament winding processes, may utilize any combination of unidirectional fibers, woven fibers and filament winding processes, can utilize thermoplastic or thermoset resins, is reliable, durable and of relatively simple design and economical manufacture and assembly, and has a long useful life in service.

BRIEF DESCRIPTION OF THE DRAWINGS

These and other objects, features and advantages of this invention will be apparent from the following detailed description of the preferred embodiments and best mode, appended claims and accompanying drawings in which:

FIG. 6 is a plan view of a plurality of woven fiber sheets used to form a composite riser according to an alternate embodiment of the invention;

FIG. 7 is an end view of a plurality of woven fiber sheets rolled up in accordance with the alternate embodiment of the invention;

FIG. 8 is a plan view of a generally rectangular blank formed during the molding of the composite riser according to the alternate embodiment of the invention;

DETAILED DESCRIPTION OF THE PREFERRED EMBODIMENTS

Figure 1:
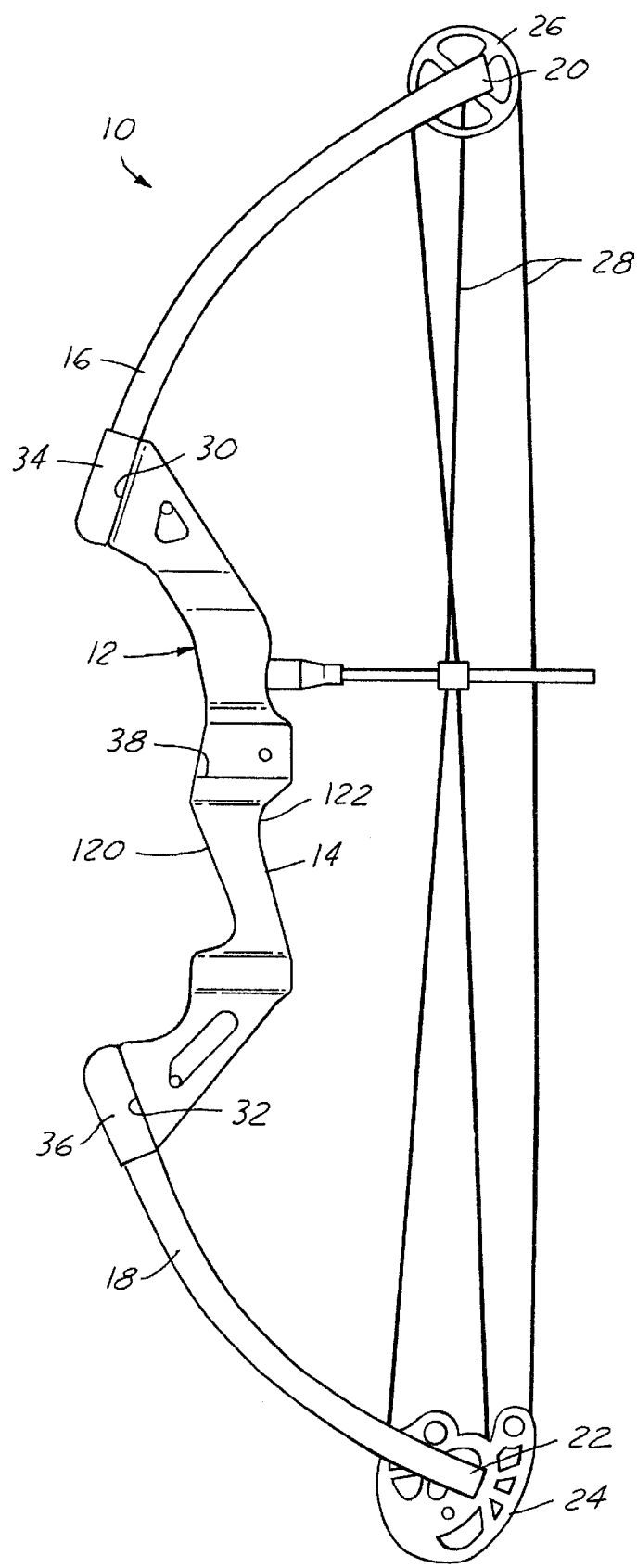
FIG. 1 is a side view of an archery bow having a composite riser according to the invention.
Figure 2:
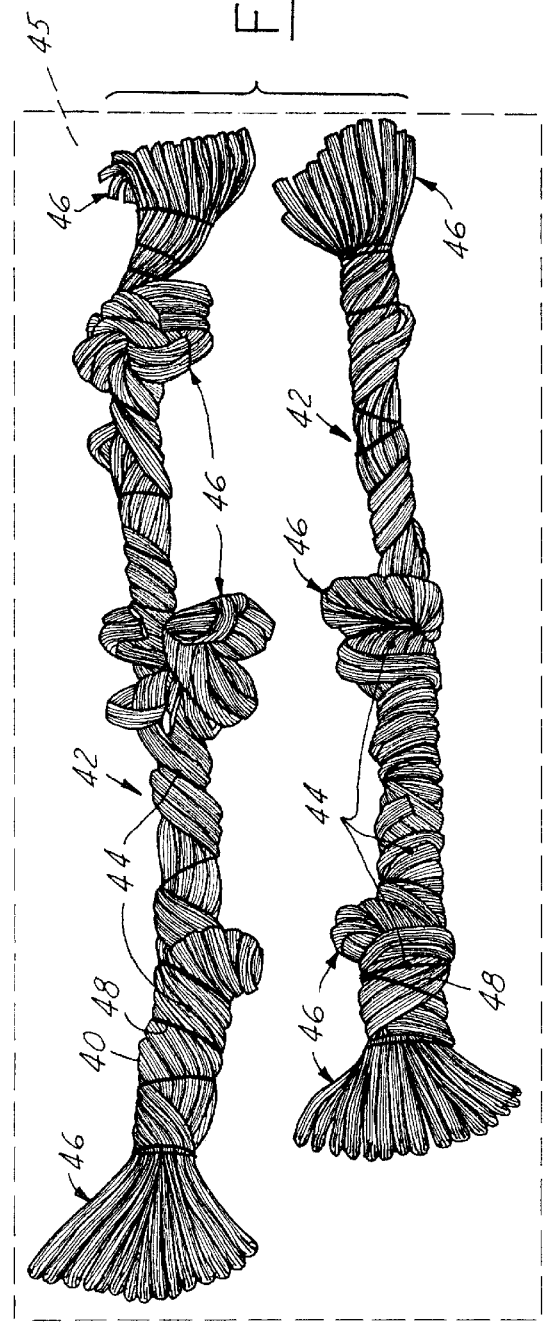
FIG. 2 is a plan view of a pair of bundles of fibers used to form the composite riser according to a preferred embodiment of the invention on a jig used to form the bundles from elongate fibers.

Referring in more detail to the drawings, FIG. 1 illustrates an archery bow 10 according to the present invention having a composite riser 12 with a handle portion 14 grippable by the user or archer. A pair of limbs 16, 18 are each connected to opposite ends of the riser 12 and extend away from the riser 12 providing free ends 20, 22, respectively, which may carry a cam 24, idler wheel 26 or the like. One or more strings 28 are connected to the bow limbs, and/or trained around the cam and idler wheel to interconnect the cam 24 and idler wheel 26 and provide a drawstring to be received in the nock of an arrow and drawn away from the riser 12 by a user to flex the limbs 16, 18 and store energy in the bow 10. Release of the drawstring releases the energy stored in the bow 10, returns the limbs 16, 18 to their unflexed position and propels the arrow forward.

The riser 12 has a pair of generally flat, planar ends 30, 32 to which pockets 34, 36 may be attached. The pockets 34, 36 receive the end of the bow limbs 16, 18 to be attached to the riser 12 and may contain one or more pivot elements to facilitate and control flexing or bending of the limbs. The riser 12 also has the handle portion 14 ergonomically designed to be gripped by the user. The riser 12 further has an arrow shelf 38 on which the arrow rests and which guides the arrow as it is shot from the bow 10. One or more bores may be integrally formed in the riser 12 to facilitate attachment of various accessories including sites, cable slides and the like.

According to a first embodiment of the invention, a resin transfer molding process may be used to form such a composite riser 12. Desirably, the material of the riser is fiberglass or carbon fibers embedded or saturated with a resin, preferably under pressure within a mold. In resin transfer molding, the fibers are first provided within the mold and thereafter, under pressure, the resin is injected into the mold and onto and between the fibers. Steps are taken to ensure the placement of the fibers within the mold and to prevent or limit the movement of the fibers by the pressurized resin which undesirably leads to resin rich areas, voids or dry fibers not completely saturated with resin.

According to a first step of the process, a plurality of elongate fiber strands 40, so-called "unidirectional fibers" are twisted, wrapped and looped in a desired manner to provide one or more bundles 42 designed to provide a desired material thickness for the riser. Preferably, the unidirectional fibers 40 are routed around various pins 44 of a lay-up jig 45 in a predetermined manner to ensure the consistency of the placement of the fibers from one riser to the next. Bunches or knots 46 may be formed at desired locations along a bundle 42 of fibers where there is a need for increased material in the finished riser 12. For example, at the ends 30, 32 of the riser 12 where the pockets 34, 36 are attached and in the shelf 38 area of the riser 12, knots 46 or bunches of fibers may be provided for the increased material needed in these locations. So wrapped together, the unidirectional fibers provide a bundle 42 of fibers having a desired shape, density and location. To maintain the shape of the braided bundle 42 of fibers, a string 48 is wrapped around the bundle 42 and is releasably attached thereon. Desirably, the string 48 may be removed when the bundles 42 are placed into a mold later in the process to avoid any interference between the resin and fibers which may be caused by the string 48. More than one braided bundle 42 of fibers may be needed to form a particular riser 12.

Figure 3:
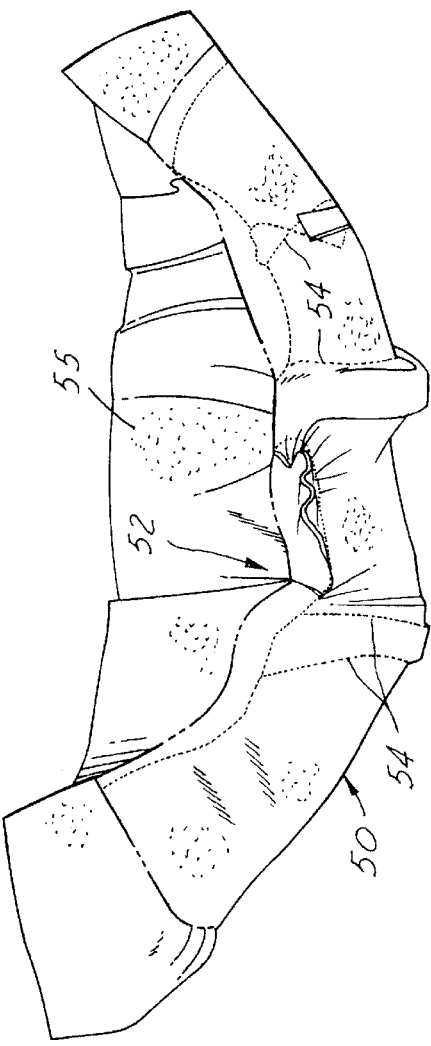
FIG. 3 is a side view of a form used to arrange bundles of fibers.

According to the next step of the process, the braided bundles 42 of fibers are transferred and inserted into a three-dimensional form 50 having an interior cavity shaped generally according to the final desired shape of the riser 12. The form 50 is preferably initially open along one side 52 to permit the elongate bundles 42 of fibers to be inserted therein, and after the bundles 42 are inserted into the form 50 it may be closed, such as by stitching or other suitable method. When stitched closed, the string 48 which maintains the individual braided bundles 42 has one end extending out of the form to facilitate removal of the string 48 before the riser 12 is formed. When the form 50 is stitched closed as shown in FIG. 3, the bundles 42 of fibers are oriented and distributed as needed to provide the desired shape and structural integrity of the riser 12. Preferably, some stitching 54 is provided across the form 50 and unidirectional fiber bundles 42 to maintain their alignment and prevent undue shifting of the fibers 40 and bundles 42 of fibers when the pressurized resin is injected onto and between these fibers. After the form 50 is closed, the string 48 around the bundles 42 of fibers may be removed. Some shifting of the fibers 40 may occur, but the orientation and arrangement of the fibers 40 is maintained by the form 50.

The form 50 is preferably formed of a material which permits the resin to flow therethrough and into the bundles 42 of fibers. Desirably, the form 50 may have small holes or perforations 55 therein which enhance or increase the flow of resin through the form. The form 50 may even increase or assist resin flow within the mold and between the fibers due to its saturation characteristics. Further, the form 50 material acts as a runner on the outside surface of the part which ensures that all outside edges of the riser 12 are saturated with resin. Generally, the edges of the riser 12 are the hardest to saturate and it is critical to saturate these areas with resin to avoid potential surface cracks due to dry fibers at the exterior of the riser 12. The form 50 may be a cloth or felt-like material, or it may be made from woven fiber cloth material, if desired.

Figure 4:
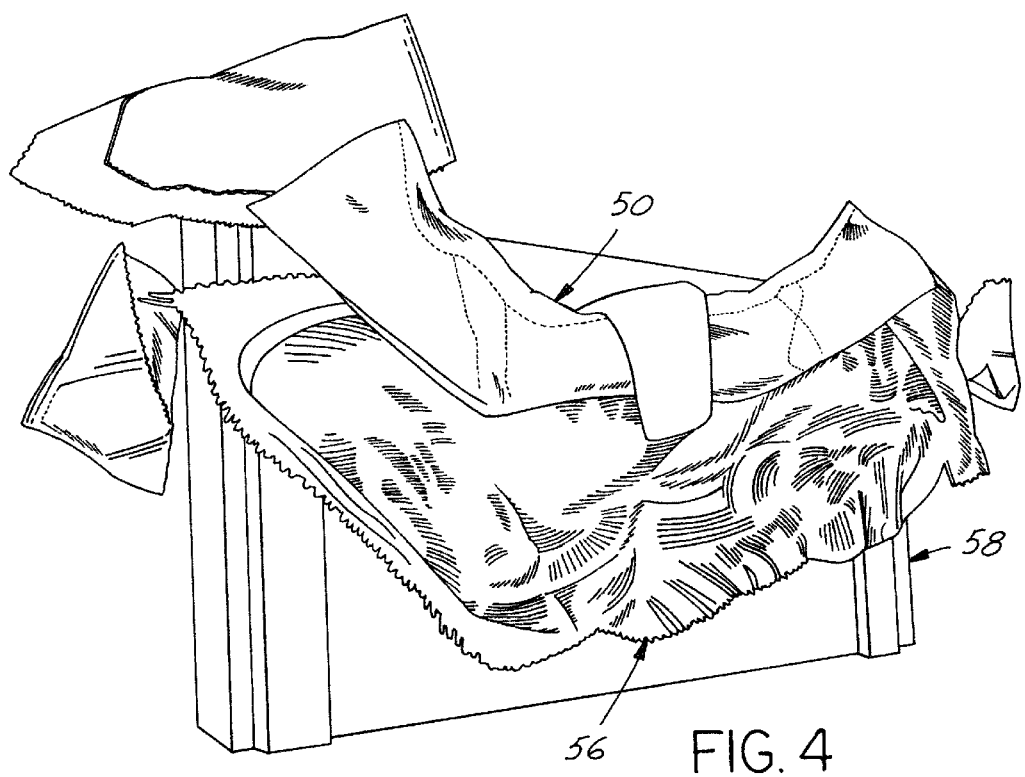
FIG. 4 is a perspective view of a jig used to form the riser.
Figure 5:
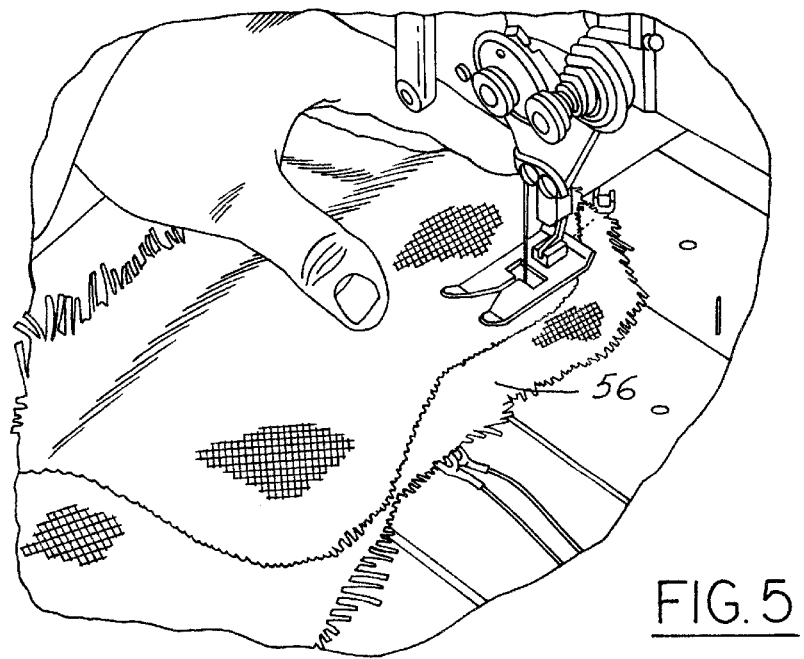
FIG. 5 is a fragmentary view illustrating woven fiber cloths stitched about the perimeter of the form.

As shown in FIGS. 4–5, to provide additional structural reinforcement, woven fiber cloth 56 may be disposed surrounding the form 50 containing the bundles 42 of fibers. The advantage of woven cloth 56 is that its fibers are oriented at various angles therein to increase the structural integrity of a component. Accordingly, a plurality of lower layers of woven fiber cloth 56 can be disposed in a jig 58 having a contour matching that of the desired final shape of the riser 12. Holes may be cut in the woven cloth material where bosses, recesses and the like are needed in the final riser 12 to allow proper material flow through the part. The form 50 containing unidirectional fibers 40 is placed onto the woven fiber cloth 56 in the jig 58. Thereafter, an upper layer of woven fiber cloth is placed over the form and the edges of the upper and lower fiber cloth layers are crimped together closely adjacent to the form with small pins or staples used to maintain the alignment of these layers. Thereafter as shown in FIG. 5, the upper and outer layers of woven fiber cloth 56 are stitched together closely adjacent to the form to maintain the orientation of the layers and the form prior to insertion of the assembly into a mold.

After the woven cloth layers 56 are oriented and stitched around the form 50 containing the unidirectional fibers, the entire assembly is placed into a mold of an resin transfer molding press. The mold is closed and resin is injected into the mold at a pressure of about 60 psi for 40 minutes at about 450° F. The stated pressure, time and temperature are representative, and are not intended to limit the invention. Rather, these cycle characteristics are representative of a cycle which provides saturation of all of the fibers, eliminating voids and dry fibers. Additionally, because the fibers are maintained in their desired orientation when placed in the mold and during the injection of the resin, resin rich areas, i.e., areas wherein there is a higher than desired concentration of a resin and a lower than desired concentration of fiber, are substantially reduced and preferably, eliminated.

Further, part to part variation is reduced, if not eliminated by providing the form 50 and specific jigs to locate the fibers in the various steps of the process. For instance, when forming the braided bundles 42 of fibers, a jig 45 utilizing pins 44 upon which the elongate unidirectional fibers 40 may be wound and braided provides consistency between bundles 42 of different risers 12. The form 50 promotes consistency in the arrangement of one or more bundles 42 therein and also limits movement of the fibers during the molding process to further promote consistency from one riser 12 to the next. Still further, the string 48 which maintains the braided bundles 42 as desired before they are placed into the form 50 and the mold further promotes consistency of the molded risers. Finally, the woven fiber cloth 56 stitched securely around the form 50 containing the bundles 42 of unidirectional fibers 40 provides a final positioning and aligning of the various fibers before the injection of the resin therein to still further promote consistency of the molded risers 12.

Accordingly, the process controls the location, distribution, orientation and limits the movement of all fibers in the mold even during the injection of the pressurized resin into the mold to provide consistent, strong, composite risers 12 which substantially reduce if not eliminate dry areas of fibers, voids in the riser or resin rich areas. Desirably, this method permits the riser 12 to be formed in substantially its final shape, without substantial machining required after molding and without a substantial amount of waste material. Accordingly, the process is very efficient and is less costly than other processes which generate significant waste material.

The composite risers 12 may also be formed by a second resin transfer molding process according to the invention. This second process utilizes woven cloth fiber sheets 70 in a manner which provides consistency from part to part and a strong, durable final product. As a first step, as shown in FIG. 6, two separate sheets of woven fibers are individually rolled up into a generally cylindrical form. The rolled sheets 72, 74 are placed one on top of another on an outer woven sheet of fibers 76 and the rolled sheets 72, 74 are then rolled up within the outer sheet of fibers 76. Additional sections 78 of fiber sheet may be provided in desired locations on the main outer sheet 76 to provide reinforcing or additional material needed in particular locations of the riser 12. When the main outer sheet 76 is rolled, the resulting bundle 80 of fiber sheets has a generally cylindrical form as shown in FIG. 7. The rolled fiber sheets provide structural integrity and has fibers oriented in various directions. The orientation of the fibers in the woven cloth provide strength in substantially all directions in use of the riser 12. Further, the woven fiber sheets permit resin to flow throughout without blocking, hesitating or resisting the resin flow to eliminate voids, dry fibers and resin rich areas.

The next step of this process comprises placing the bundle 80 of rolled fiber sheets into a mold and inserting the mold into a press for injection of the resin into the mold and onto and between the fibers of the woven sheets. The same process and cycle parameters may be used during the molding in this process as in the previous process, although other times, temperatures and pressures for the molding may be used. As shown in FIG. 8, the resulting blank 82 has a generally rectangular perimeter and may have a contour or profile providing the shelf 38, ends 30, 32 and general outline of the riser 12.

The blank 82 is preferably somewhat larger than necessary providing excess material around the perimeter of the blank 82. To provide the final shape of the riser, the excess material is machined away. Additionally, several risers 12 may be machined from a single blank, if desired. Notably, the most difficult portions of the fibers to saturate with resin are at the exterior of the part within the mold. Accordingly, around the perimeter of the blank 82 there may be areas of dry fibers, or fibers which are not fully saturated with resin. Meanwhile, within the interior of the blank 82, the fibers are fully or completely saturated with resin without any voids or resin rich areas. Accordingly, machining away the excess material at the perimeter of the blank 82 removes the weaker portions of the blank 82 which contain the dry fibers and/or voids. Desirably, the remaining portion which forms the riser 12, consists of the strongest portions of the blank 82 to improve the performance of the riser 12. Desirably, this provides consistency from part to part in a relatively simple process for forming composite risers 12. One drawback to this approach is the amount of material wasted and machined away due to the necessity of forming an oversized blank 82 and the removal of the weaker, outer perimeter of the blank 82 to form the riser 12. However, consistent, strong composite risers 12 may be formed according to this process.

Figure 9:
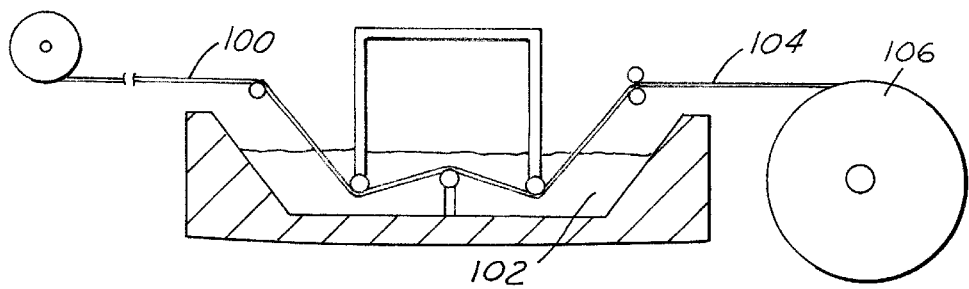
FIG. 9 is a diagrammatic view of a filament winding process used to form an archery bow according to another alternate embodiment of the invention.
Figure 10:
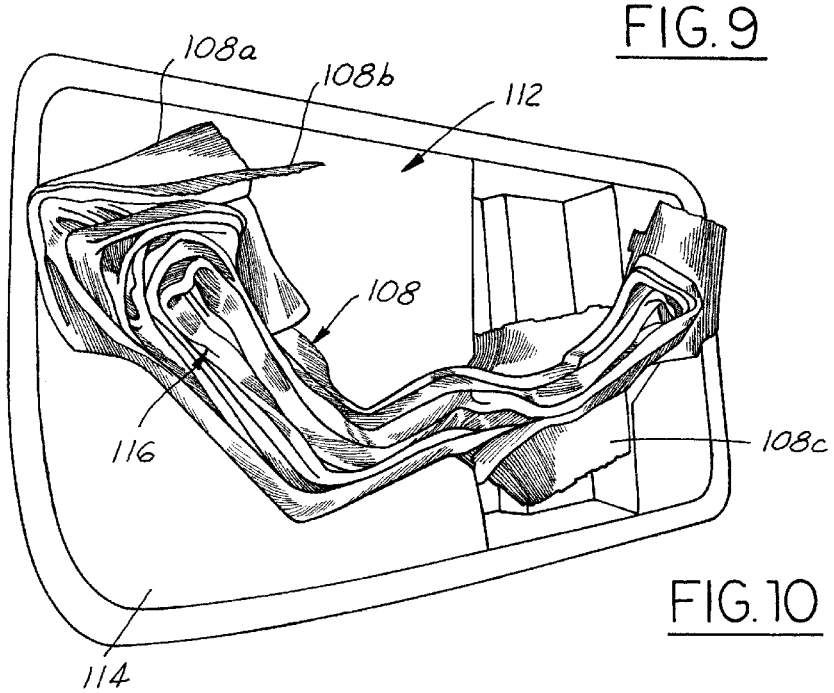
FIG. 10 is a perspective view of a bottom half of a lay up jig used to form the riser.
Figure 11:
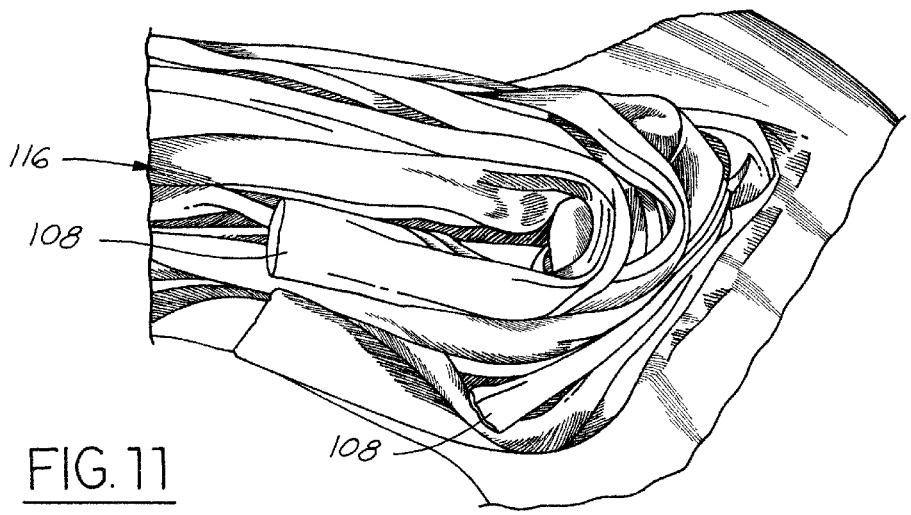
FIG. 11 is an enlarged fragmentary view of a portion of the lay up jig of FIG. 10.

A third method of forming a composite riser 12 according to the invention utilizes a modified compression molding process. As shown in FIG. 9, using filament winding technology, elongate fibers 100, such as carbon or fiberglass fibers are impregnated or soaked with a resin by passing them through a resin bath 102. The resin impregnated fibers 104 are rolled onto a drum 106 or mandrel to a specified tow. The process is not continuous, but rather used to provide individual fibers into thin flat sheet form 108 for subsequent use in forming the riser 12. The tow of the sheet can be readily varied by the filament winding equipment. A tow of 50 k has been found to be suitable for forming the composite risers 12. A smaller tow requires additional sheets per part which can increase the cost of forming the sheets and the labor and costs of arranging and combining the sheets to form the part. Additionally, the bigger the tow the less the void content will be throughout the part after molding. By impregnating the fibers 100 individually with resin, dry fibers and voids in the part are eliminated.

As shown in FIGS. 10–14, according to a second step of this process, strips or sections of the sheets 108 are cut in desired manner and placed into a jig 112 having the contour of one-half, the bottom half for example, of the riser 12. For example, a bottom 114 of the jig 112 may be layered with sheets 108a cut at 90° to the direction of the fibers on a sheet, other sheets 108b at 45° to the direction of the fibers of the sheet and other sheets 108c at 0° or along and in the direction of the fibers along the sheet. These sheet sections 108a–c are laid into the bottom 114 of the jig 112 and are pressed therein to fit exactly within the contours of the jig to eliminate any voids or gaps therein. Some excess material may extend out of the contoured recess of the jig which defines the final shape of the riser. Preferably, more than one layer of the sheet material is packed into the bottom of the recess of the jig with subsequent layers of material oriented at different angles than the adjacent layers of material to provide improved structural integrity to the molded part.

Thereafter, one or more sheets 116 of resin impregnated fibers are rolled into a tubular or cylindrical shape and wrapped within a recess of the jig 112 on top of the layers of flat sheets 108a–c therein. Desirably, the rolled sheet 116 is provided in the jig in a predetermined manner to promote consistency between parts and to eliminate failure spots. Desirably, the ends 118 of the rolled sheet 116 are not provided along the exterior of the riser. This eliminates the potential for cracks to propagate at the surface of the riser along the discontinuity or end 118 of the rolled sheet 116. The compression and tension forces on the riser 12 are greatest along the exterior or perimeter of the riser 12 and any discontinuities, voids, resin rich areas or dry fibers along the exterior of the part may fail in use of the riser 12. The rolled sheet 116 may have a diameter of between ⅛ of an inch and ½ inch, and preferably about ¼ of an inch for the particular application of forming a composite riser 12. The ends 118 of the rolled sheet 116 are preferably located adjacent to the ends 30, 32 of the riser where the pockets 34, 36 are attached to receive the limbs 16, 18. Desirably, there is no discontinuity in the material of the riser 12 on either its tension side 120 (FIG. 1) or compression side 122 (FIG. 1) of the riser 12 to avoid failure in use.

Figure 12:
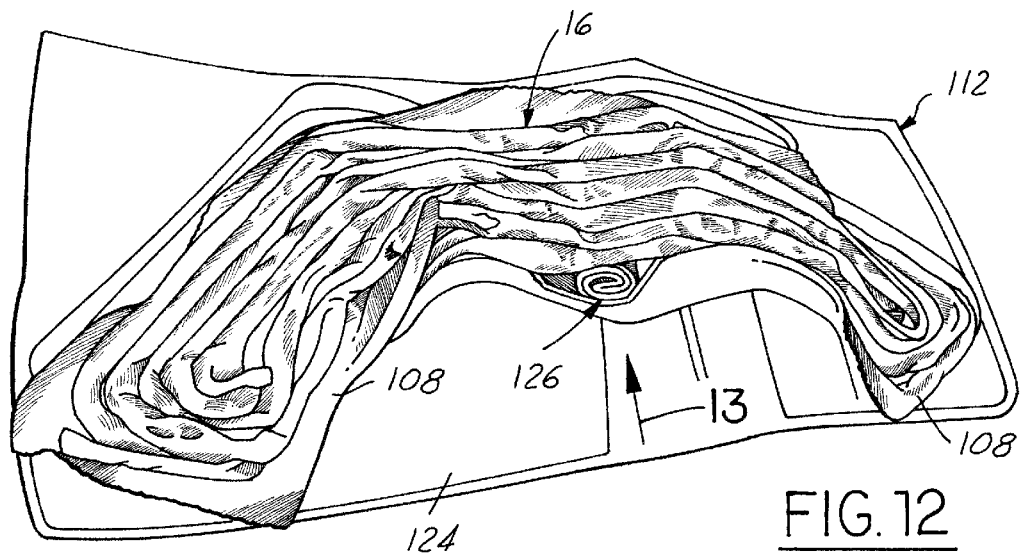
FIG. 12 is a perspective view of an upper half of the lay up jig.
Figure 13:
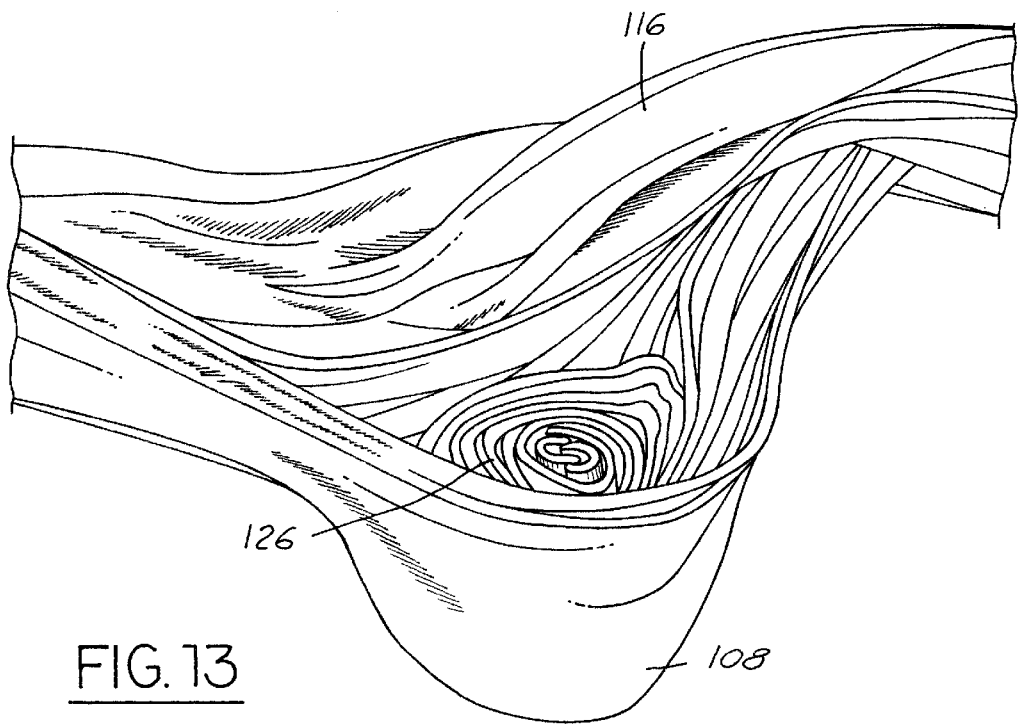
FIG. 13 is an enlarged fragmentary view of a portion of the lay up jig of FIG. 12.
Figure 14:
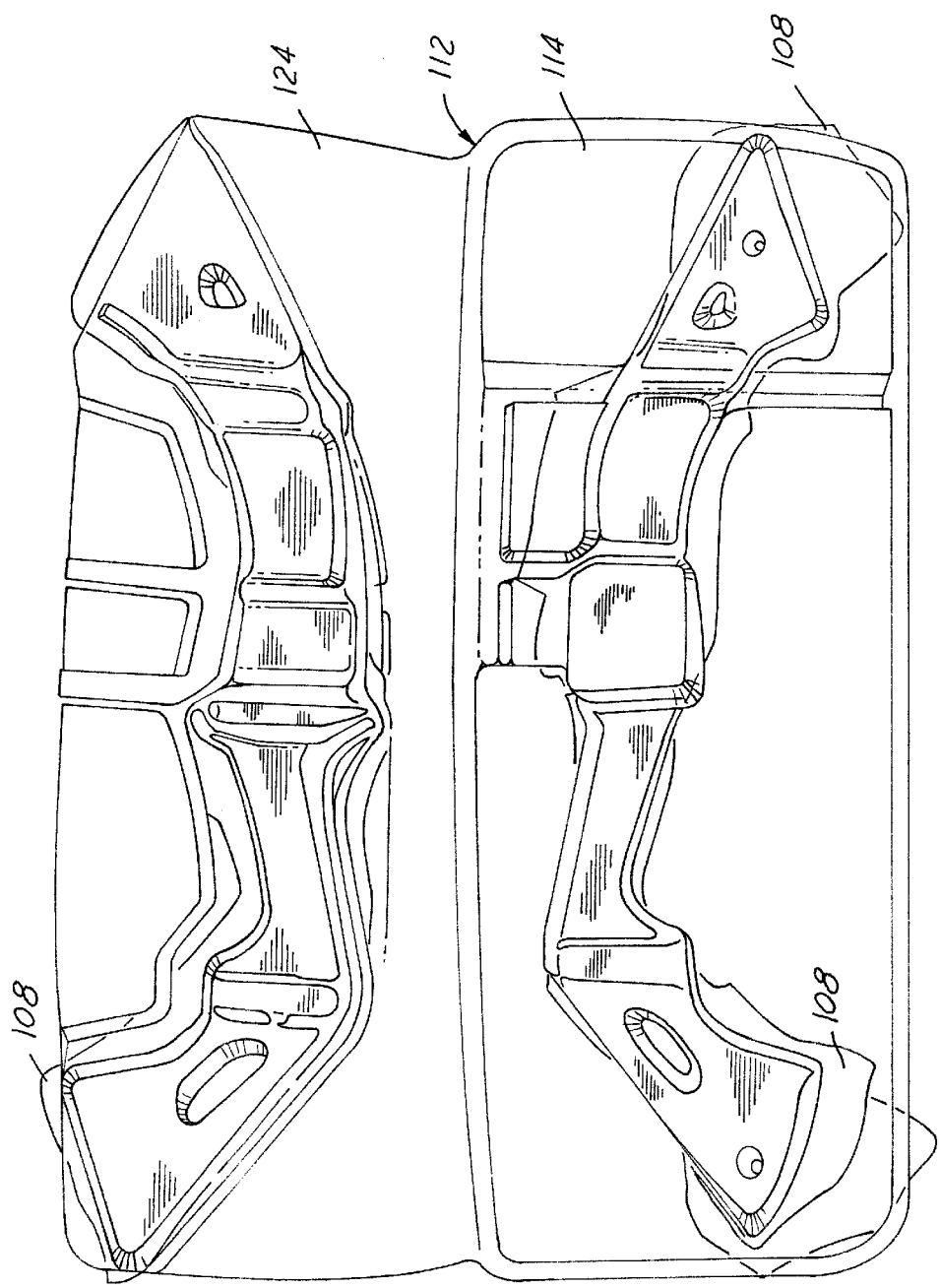
FIG. 14 is a plan view of the rear side of the upper and lower halves of the lay jig used to form the riser.

Next, as shown in FIGS. 12–13, an upper half 124 of the jig 112 is packed with multiple layers of resin impregnated fiber sheets 108 in the same general manner of the lower half 114 of the jig 112 was packed. Again, desirably, the layers are cut and oriented at different angles relative to the orientation of the fibers of the sheet. To provide additional material in the area of the shelf 38 of the riser 12 and other places as needed, small sections 126 of a sheet can be rolled into a generally cylindrical form and inserted between the layers or on the layers as desired, as shown in FIG. 13. Thereafter, as in the lower half 114 of the jig 112, one or more sheets of fibers are rolled into generally cylindrical form 116 of between ⅛ of an inch and ½ inch or more in diameter, preferably about ¼ of an inch in diameter, and are wound and packed into the recess of the upper half 124 of the jig 112 in the same general manner as described with reference to the bottom half 114 of the jig 112. Notably, care is taken to ensure that the outer loop or wrap of material in the rolled cylindrical sheet 116 does not contain any discontinuities along the tension or compression sides 120, 122 of the riser 12.

After the halves 114, 124 of the jig 112 have been packed and arranged as described, the material of each half of the jig 112 is removed and placed into a corresponding cavity of a mold. The material removed from the jig 112 will retain the shape imparted onto the material by the jig 112 which is very close to the final shape of the riser 12. In this manner, the fibers 100 will be held in place consistently and efficiently from one molded part to another because of their consistent forming in the jig 112 prior to the molding operation. The mold halves of the press are brought together and the molding process is commenced. In this process, because the fibers 100 are preimpregnated with resin, no resin need be injected into the mold, rather pressure and heat are applied to the material in the mold to bond the adjacent material portions together to provide a solid, uniform, integral part. In one embodiment, a molding press operated at 40 tons at a temperature of 120° C. is used to form the part at a cycle time of about 20 minutes. After molding, the formed riser 12 is ejected from the mold and is placed into a straightening jig (not shown) to ensure the straightness of the riser is maintained as it cools. The straightening jig, in other words, prevents warping or distortion of the molded riser upon cooling. When fully cooled, any excess material or flash can be removed from the molded riser 12 to complete the formation of the composite riser 12.

The third process provides desired structural integrity because the resin and fibers are compressed together under significant pressure to minimize or eliminate voids and de-lamination of layers or fibers. This process is similar to forging metal parts. Better molded part consistency is achieved due to the use of the pre-form jig 112 and the pressure under which the riser 12 is molded. The relatively short mold cycle time permits fast production of parts and reduced manufacturing costs to produce parts.

Desirably, each process uses a thermosetting epoxy resin to avoid use of breathers, release films, vacuum bags and the like which are typically needed when working with thermoplastic resins. Notably, the thermoset resins cure at the elevated molding temperatures over time. The processes requires less time, labor and material. Further, by providing the pre-form jigs, the orientation of the fibers can be controlled and consistency between various parts is maintained to ensure quality and integrity of the formed part. The thermoset resins provides superior resistance to de-lamination compared to thermoplastic resins due to the molecular bonding differences between the two types of resin. However, the process may be performed with a thermoplastic resin, requiring a cooling step to cure the thermoplastic resin.

An additional method to form a composite riser is by a variable infusion molding process. This process is substantially the same as that of the first resin transfer molding process described previously. In the variable infusion molding process however, the resin is injected into the mold and saturates the fibers of the part from the inside of the part toward the outside of the part rather than, as in the resin transfer molding process, from the outside of the part towards the inside of the part. Some advantages attendant with the variable infusion molding process include material cost savings, it is production and environmentally friendly, can produce a superior surface finish and enables the part to be dyed during molding for camouflage or other desired appearance. Steps to accomplish this method are the same as that for the resin transfer molding processes with the exception that the resin is injected from the inside out rather than from the outside to the inside. Accordingly, this process will not be described further.

Another method of forming a composite riser includes the formation of IsoTruss™ grid structures which utilize symmetrical, highly redundant grid structures of simple geometry, usually without any longitudinally extending fibers to increase the rigidity and strength of the structure. If desired, longitudinal fibers can be included and incorporated with the grid structures. For example, longitudinal fibers may be provided on the outside of the truss structure in order to provide a smoother surface, among other reasons. In general, the grid structures utilize fibers oriented at various controlled angles to provide rigidity of the structure in all directions of movement and stress. Ideally, such grid structures could be utilized, impregnated with resin and molded by any one of the previously described processing steps for forming a composite riser. Desirably, the grid structures may be reinforced with woven fiber cloth or with unidirectional fiber bundles as desired.

In any event, in all methods, the orientation, location and distribution of fibers is controlled relative to the final part and relative to the resin impregnated in the fibers and molded therewith. This enables consistency from part to part to facilitate manufacturing commercially robust risers which are extremely lightweight, strong, rugged, durable, and provide exceptional performance characteristics in an archery bow.

What is claimed is:

1. A method of making a composite riser for an archery bow, comprising the steps of:
   a) orienting fibers in a desired manner to ensure proper arrangement of the fibers in the riser;
   b) providing a three dimensional form having an interior cavity, and arranging and enclosing the oriented fibers in the interior cavity of the three-dimensional form;
   c) placing the form with the fibers arranged therein into a mold;
   d) providing a resin into the mold on the fibers and between adjacent fibers;
   e) maintaining the orientation of the fibers in the form and the mold even after the mold is closed;
   f) molding the resin and fibers under pressure; and
   g) curing the resin to form the composite riser.

2. The method of claim 1 wherein step a) is accomplished by arranging fibers in a predetermined pattern forming at least one bundle of fibers.

3. The method of claim 1 wherein step e) is accomplished by maintaining the fibers in the form throughout the remainder of the process.

4. The method of claim 1 wherein the form readily permits resin flow therethrough to allow the resin to flow through the form and onto and in between the fibers.

5. The method of claim 1 wherein step d) is accomplished by injecting the resin under pressure into a mold containing the fibers.

6. The method of claim 5 wherein the resin is injected into the mold so that the resin flows from the outside of the three-dimensional form toward the inside of the three-dimensional form.

7. The method of claim 5 wherein the resin is injected into the mold so that the resin flows from the inside of the three-dimensional form toward the outside of the three-dimensional form.

8. The method of claim 1 wherein step a) is accomplished by winding elongate fiber strands around pegs of a lay-up jig to permit consistent arrangement of the fibers from one riser to the next.

9. The method of claim 1 wherein woven fiber sheets are disposed on the exterior of the form prior to placing the form into the mold.

10. The method of claim 1 wherein the form comprises at least one woven sheet of fibers having a predetermined shape.

11. The method of claim 1 wherein the resin is a thermoset and is cured at an elevated temperature over time.

12. The method of claim 1 wherein the resin is a thermoplastic and is permitted to cool to cure.

13. The method of claim 3 further comprising stitching the form and fibers together to maintain the fibers in the form.

14. The method of claim 4 including providing perforations in the form to facilitate resin flow through the form and into the fibers.

15. The method of claim 10 further comprising stitching the at least one woven sheet to itself to close the form about the fibers.

16. The method of claim 15 further comprising stitching the woven sheet to the fibers.

17. A method of forming a composite riser for an archery bow, comprising the steps of:
 a) orienting unidirectional fiber strands into at least one bundle of fiber strands;
 b) providing a three dimensional form having an interior cavity, and placing said at least one bundle of fiber strands into the cavity of the form to provide a desired location and orientation of the at least one bundle of fiber strands;
 c) placing the form containing the at least one bundle of fiber strands into a mold;
 d) closing the mold;
 e) injecting a resin into the mold under pressure to combine the resin with the fiber strands;
 f) maintaining the pressure within the mold for a sufficient time to ensure proper combination of the resin and fiber strands; and
 g) curing the resin to form the composite riser.

18. The method of claim 17 wherein the resin is a thermoset and is cured at an elevated temperature over time.

19. The method of claim 17 wherein the resin is a thermoplastic and is permitted to cool to cure.

20. The method of claim 17 which also comprises the step of disposing woven fiber sheets around the form prior to step d).

21. The method of claim 17 further comprising stitching the form to the fibers prior to step c).

* * * * *